UNITED STATES PATENT OFFICE.

ISRAEL KAATZ AND RUDOLF SCHULZ, OF MILWAUKEE, WISCONSIN.

INSECTICIDE.

SPECIFICATION forming part of Letters Patent No. 360,700, dated April 5, 1887.

Application filed August 20, 1886. Serial No. 211,400. (No specimens.)

*To all whom it may concern:*

Be it known that we, ISRAEL KAATZ and RUDOLF SCHULZ, citizens of the United States, residing at Milwaukee, in the county of Milwaukee and State of Wisconsin, have invented certain new and useful Improvements in Compositions for Destroying Potato-Bugs; and we do hereby declare the following to be a full, clear, and exact description of the invention, such as will enable others skilled in the art to which it appertains to make and use the same.

Our invention relates to improvements in that class of compositions employed for destroying the well-known destructive and objectionable potato-bugs; and the object of the invention is to produce a composition that will effectually destroy the larvæ, as well as the potato-bugs on the plants, in an expeditious and thorough manner, at a very reasonable expense, and to furnish the composition in the form of a salve, or in such a state that it can be easily transported and also preserved in a very small space, and so as to facilitate its ready dissolution in water when it is to be used.

Our composition consists of the following ingredients, combined in about the proportions stated, viz: alkali, one and one-half part; sugar, one-eighth part; cocoanut-oil, one part; chloride of potassium, one-sixteenth part; hydrate of lime, one-tenth part; carbonate of soda, one-sixth part; Persian insect-powder, one-sixteenth part; solution of arsenic, one-eighth part; fennel-root, one-twentieth part; borax, one-sixteenth part.

By "alkali" we mean potash, prepared by or extracted from the ashes of beech-wood. "Lime hydrate" means slaked lime. "Sodium carbonate" means crystal soda. The potash is used to dissolve the composition quicker in water and keep the plants moist. The crystal soda renders the composition more solid, thus greatly facilitating the packing up in tin cans. The lime is only intended to form a better combination for the composition.

In the production of this composition the ingredients are to be thoroughly mixed by agitation and boiling in the following manner, viz: One part of cocoanut-oil, one and one-half part of alkali, and one-eighth part of sugar are first boiled together for about one-quarter of an hour, after which the chloride of potassium, one-sixteenth part, one-tenth part hydrate of lime, one-sixth part of bicarbonate of soda, one-sixteenth part Persian insect-powder, one-eighth part solution of arsenic, one-twentieth part fennel-root, and one-sixteenth part borax are slowly added.

The composition, in proportion of one pound to thirty-two gallons of water, is then sprinkled over the potato-plants by means of a watering-pot, a pump and hose with sprinkler, or in any other manner suitable to distribute it over said plants.

By the use of this composition, the potato-bugs, as well as the larvæ, will be thoroughly and surely destroyed and exterminated without injury to the plants themselves. It can be readily applied in an expeditious manner and at very small expense. By producing it in the consistence of a salve, it can be transported in a very small compass, and can then be easily dissolved in the water when it is desired to use it. In the shape of salve it will not deteriorate, and will retain its qualities for a long time.

We are aware that compositions of different kinds have been used for the same purpose; but it has been found that these have not proved fully efficacious, or they were too expensive to be employed.

Having thus described our invention, what we claim, and desire to secure by Letters Patent, is—

The herein described composition of matter to be used for destroying potato-bugs, consisting of alkali, sugar, cocoanut-oil, chloride of potassium, hydrate of lime, carbonate of soda, Persian insect-powder, solution of arsenic, fennel-root, borax, and water, in about the proportions specified.

In testimony whereof we hereby affix our signatures in presence of two witnesses.

ISRAEL KAATZ.
RUDOLF SCHULZ.

Witnesses:
O. J. FIEBING,
CHAS. FRIEDRICH.